April 25, 1961 C. B. ESTES 2,981,165
VIEWFINDER SIGNAL FOR PHOTOGRAPHIC CAMERAS
Filed Oct. 29, 1959
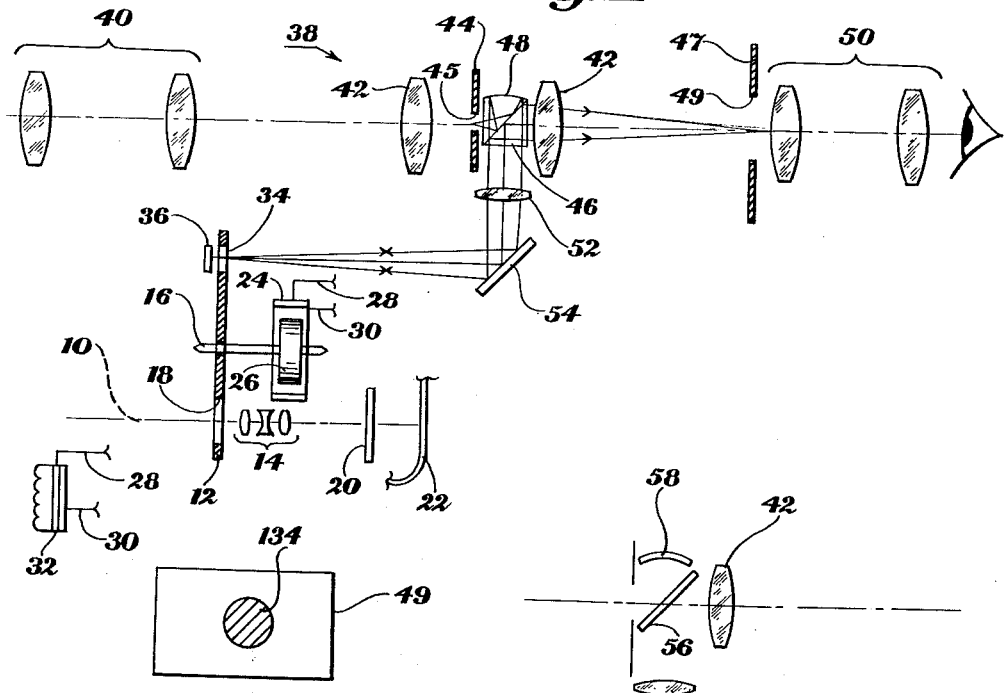
Cameron B. Estes
INVENTOR.
BY R. Frank Smith
Robert W. Hampton
ATTORNEYS

United States Patent Office 2,981,165
Patented Apr. 25, 1961

2,981,165

VIEWFINDER SIGNAL FOR PHOTOGRAPHIC CAMERAS

Cameron B. Estes, Rochester, N.Y., assignor to Eastman Kodak Company, Rochester, N.Y., a corporation of New Jersey Filed Oct. 29, 1959, Ser. No. 849,685

6 Claims. (Cl. 95—10)

The present invention relates to photographic cameras having automatic exposure control systems, and more particularly relates to means for indicating low scene brightness in such cameras.

It is convenient for the operator of a motion picture or still camera, which has an automatic exposure control system, to be warned, by a signal appearing in the camera finder, when scene brightness is below the range for which the camera is designed. Numerous devices have been proposed for presenting a low-light signal in the camera finder in such cases. However, signals of this type generally have been conducted or reflected into the finder by means of a Lucite or similar rod or a mirror that actually extends into the finder. With systems of this type, the light-conducting rod or mirror is located at the bottom of the finder in order to minimize its obstruction of the viewed photographic subject.

It is a primary object of the invention to produce a non-obstructing visual signal in the finder of a camera having an automatic exposure control system, for warning the camera operator when scene brightness is less than a predetermined value.

A further object of the invention is to produce such a signal near the center of the field of view of a camera finder.

Another object of the invention is to control the appearance of such a signal by means of the automatic exposure control system of the camera.

The above objects are accomplished, according to one form of the invention, by providing a beam splitter in the camera finder for reflecting a part of the scene light out of the finder and toward a modulator, which produces a signal in the form of the presence or absence of a beam of light, to represent the presence or absence of sufficient scene brightness for normal photography. The modulator may be an aperture in an exposure member (or a member moving therewith), which is moved automatically as a function of scene brightness. The modulator, or signal beam is reflected back to the beam splitter and, by the latter device, is reflected rearwardly through the remainder of the finder system.

Other objects of the invention will appear from the following description, reference being made to the accompanying drawings, wherein:

Fig. 1 is a schematic right side view of the basic elements of a motion picture camera embodying one form of the present invention;

Fig. 2 is a rear view of the camera finder, showing a centralized low-light signal;

Fig. 3 shows the progressive appearance of the low-light signal in the finder; and Fig. 4 illustrates an alternate means for transmitting scene light out of the finder to a modulator, receiving a signal beam from the modulator and transmitting the signal beam rearwardly in the finder.

Referring to Fig. 1, a typical camera embodying the invention has a taking-lens axis 10 on which are arranged a diaphragm vane 12, a taking-lens system indicated generally at 14, a shutter 20 and a photosensitive surface such as a filmstrip 22. The diaphragm vane may be formed as a disc pivoted centrally on a shaft 16 and having an exposure aperture 18, which moves in a path crossing the lens axis 10 for establishing a lens aperture whose area is a function of the angular position of the diaphragm vane. The diaphragm vane may be positioned automatically, in a manner well known in the art, by means of a galvanometer coil 24 which is connected to and rotates the diaphragm shaft 16. Coil 24 cooperates with a permanent magnet core 26 and is connected by leads 28 and 30 to a photocell 32, which is exposed to scene light. Variations in scene brightness cause the coil 24 to be variably energized by photocell 32 and thereby cause the coil to move shaft 16 and vane 12 angularly for establishing a position of the vane corresponding to scene brightness. The structure and operation of the galvanometer and photocell are well known in the art and may be of the type disclosed in U.S. Patent 2,509,893, granted May 30, 1950 to C. F. Taylor et al.

Although the drawings illustrate a motion picture camera wherein the exposure is automatically controlled by positioning a diaphragm vane, it will be understood that the invention has equal utility in conjunction with other forms of automatic exposure control, e.g., in still or motion picture cameras wherein shutter speed is automatically controlled instead of or in addition to diaphragm opening.

When the scene brightness is less than the range for which the camera is designed the diaphragm vane 12 stands in an angular position such that a modulating or signal aperture 34 is aligned with a mirror 36 for reflecting a warning-signal beam into the camera finder. The finder is illustrated as a telescopic viewfinder 38 having an objective 40, a pair of erector lenses 42, a diaphragm 44 located between the erector lenses and having a central aperture 45, a viewfinder frame 47 located in the second image plane and having a framing aperture 49 and an eyepiece 50.

A portion of the scene light passing through aperture 45 of the viewfinder diaphragm 44 is reflected upwardly by a cube beam splitter 46, which is located between diaphragm 44 and the rear erector lens 42. The beam splitter is provided with an upper concave reflecting (for example, aluminized) surface 48, which images aperture 45 at infinity and redirects the reflected beam of light downwardly through the beam splitter and through a lens 52. A mirror 54 reflects this beam of light forwardly toward mirror 36.

When aperture 34 of the diaphragm vane 12 is aligned with mirror 36, the beam of light from mirror 54 passes through that aperture and is reflected by mirror 36 back through aperture 34. This beam is further reflected by mirror 54 and the beam splitter 36 rearwardly through the remainder of the viewfinder system. In this event an image of the viewfinder-diaphragm aperture 45 is formed in the second focal plane of the finder and appears as a spot of light 134 (Fig. 2) in the finder field. When the diaphragm vane is in any position corresponding to the exposure range of the camera, the beam of light that is reflected forwardly from mirror 54 passes only partially or not at all through aperture 34 of the vane and strikes a nonreflecting rear surface of the vane. This causes the spot of light to disappear partially (as illustrated in Fig. 3) or fully from the finder, thereby indicating that the scene has sufficient brightness for normal photography.

An alternate form of beam splitter is illustrated in Fig. 4 wherein a partially transparent plane plate 56 is employed as the beam splitter and a separate aluminized reflector is employed for imaging the diaphragm aperture of the finder at infinity.

The invention has been described in detail with particular reference to preferred embodiments thereof, but it will be understood that variations and modifications can be effected within the spirit and scope of the invention as described hereinabove and as defined in the appended claims. In particular, it will be apparent that the use of an ear on the diaphragm vane or other member moved by the exposure control system, is equivalent to the disclosed aperture as a light modulating device for producing a warning signal. So, also is the use of a mirror on the vane or other moving member, to replace entirely mirror 36.

I claim:

1. In a camera having a finder for receiving scene light and an automatic exposure control system for regulating the exposure of film in said camera, the combination comprising: means including a beam splitter located in said finder for transmitting a beam of scene light from said finder through a path outside of said finder; modulating means controlled by said exposure control system and movable thereby into and out of said path for modulating said beam as a function of scene brightness; and means for transmitting said modulated beam back to said beam splitter for reflection by said beam splitter rearwardly in said finder.

2. The combination defined in claim 1, wherein said modulating means includes a member moved into and out of said path by said exposure control system as a function of scene brightness.

3. The combination defined in claim 2, wherein said moving member has an aperture therein moving into and out of the path of said beam; with a reflecting device disposed in said path on the opposite side of said moving member from said beam splitter, for receiving said beam through said aperture and reflecting said beam back through said aperture to said beam splitter when said aperture is in said path.

4. In a camera having an automatically adjusted exposure control system for regulating the exposure of film in said camera, and having a telescopic finder with an axis on which are arranged an eyepiece, an objective, and a pair of erector lenses located between said eyepiece and said objective, the combination comprising: a beam splitter located on said axis between said erector lenses for receiving scene light in said finder and reflecting a beam of said light in a first direction substantially perpendicular to said axis; a concave reflecting surface for receiving said beam from said beam splitter and reflecting the same back through said beam splitter in a second direction generally opposite said first direction; and means controlled by said exposure control system, in response to a predetermined adjustment of the latter, to reflect said beam back to said beam splitter, for reflection by said beam splitter rearwardly into said eyepiece.

5. In a camera having a finder for receiving scene light and having an adjustable exposure control system for regulating the exposure of film in said camera, the combination comprising: means including a beam splitter located in said finder for transmitting a beam of scene light from said finder through a predetermined path outside of said finder; and modulating means controlled by said exposure control system, in response to a predetermined adjustment of the latter, to reflect said beam back to said beam splitter for reflection by said beam splitter rearwardly in said finder.

6. The combination defined in claim 5, wherein said modulating means comprises an exposure control member moved as a function of scene brightness and having an aperture therein moving into and out of said path in response to movement of said member; and a mirror located on said path on the side of said member opposite said beam splitter for receiving said beam through said aperture and reflecting the same back through said aperture when said aperture is aligned with said path.

References Cited in the file of this patent

UNITED STATES PATENTS

| | | |
|---|---|---|
| 2,297,262 | Tonnies | Sept. 29, 1942 |
| 2,841,064 | Bagby et al. | July 1, 1958 |

FOREIGN PATENTS

| | | |
|---|---|---|
| 712,350 | Germany | Oct. 16, 1941 |
| 1,096,379 | France | Jan. 26, 1955 |
| 784,014 | Great Britain | Oct. 2, 1957 |
| 1,056,472 | Germany | Apr. 30, 1959 |